United States Patent [19]

Monahan-Mitchell et al.

[11] Patent Number: 5,381,346
[45] Date of Patent: Jan. 10, 1995

[54] VIRTUAL DATA SOURCE FOR A RADIO TRANSCEIVER

[75] Inventors: Timothy A. Monahan-Mitchell, Deerfield Beach; Karl R. Weiss, Plantation, both of Fla.

[73] Assignee: Motorola, Inc., Schaumburg, Ill.

[21] Appl. No.: 906,963

[22] Filed: Jun. 30, 1992

[51] Int. Cl.⁶ .......................................... G06K 11/16
[52] U.S. Cl. ................................. 364/514; 455/33.1; 455/49.1; 455/54.1
[58] Field of Search ................. 455/17, 11.1, 34.1, 455/56.1, 49.1, 54.1, 33.1; 370/85.1, 85.14; 379/63; 364/514

[56] References Cited

U.S. PATENT DOCUMENTS

| | | |
|---|---|---|
| 4,475,156 | 10/1984 | Federico et al. |
| 4,637,022 | 1/1987 | Burke et al. |
| 4,684,941 | 8/1987 | Smith et al. |
| 4,692,945 | 9/1987 | Zdunek ............................. 455/17 |
| 5,001,666 | 3/1991 | Thompson et al. |
| 5,054,109 | 10/1991 | Blackbury ........................ 455/17 |
| 5,060,140 | 10/1991 | Brown et al. |
| 5,060,150 | 10/1991 | Simor . |
| 5,095,529 | 3/1992 | Comroe et al. ................... 455/17 |
| 5,133,080 | 7/1992 | Burras ............................. 455/34.1 |

*Primary Examiner*—Ellis B. Ramirez
*Assistant Examiner*—Thomas Peeso
*Attorney, Agent, or Firm*—Juliana Agon; M. Mansour Ghomeshi

[57] ABSTRACT

In a radio transceiver having a microcomputer (11) that controls various hardware-dependent components (220) and functions (240) that form a plurality of radio control processes, a method and apparatus for executing the radio control processes includes providing the microcomputer (11) with a plurality of virtual sources (272). The virtual sources (272) are for collecting and distributing data (440) generated by the hardware-dependent components (220) and functions (240) in the radio transceiver. A plurality of hardware-independent tasks (292, 392) for executing the radio control processes are also provided by the microcomputer. A distribution controlling interface standard (228) for controlling which hardware-independent task (292, 392) will receive from which virtual source (272) is further provided by the microcomputer (11).

19 Claims, 6 Drawing Sheets

VIRTUAL DATA SOURCE FOR A RADIO TRANSCEIVER

TECHNICAL FIELD

This invention relates generally to microcomputer controlled radio communication devices, and in particular to applications, operating system, and architecture suitable for use in processing tasks as necessary in these devices.

BACKGROUND

Computers typically execute a series of tasks suitable for the intended application. A "task" is defined as a self-contained package of data and executable procedures which operate on that data, perform logical functions, and are comparable to "processes" in other known systems. In an operating system environment, the operating system provides housekeeping, or direct control of the processes or tasks within the software package. The process, or task, is typically made up of one or more subroutines.

Within a process, it is desired that the data be accessible to that process and cannot be accessed from the outside, i.e., by other processes. Processes can be used to implement "objects", "modules", or other higher-level data abstractions. Data abstraction is only one element of a good design and of portability, or flexibility, for reuse in changing applications. As is known, the other design and reuse objectives are structure, modularity, information hiding, and hierarchy.

Correspondingly, in radio applications, a need exists to reduce design time and increase design efficiency by utilizing a common software platform, capable of reuse, or portability, for all new radio products. To implement some of these design objectives, a tri-level microprocessor radio operating system, in one known system, provided a background executive to allow processing of time-insensitive tasks, a foreground routine to allow processing of real-time sensitive tasks, and a mid ground executive to allow processing of time-sensitive tasks. In a two-way radio having radio functions controlled via a microprocessor, some examples of time-insensitive tasks are tasks that respond to an operator input. Examples of real-time sensitive tasks are signal encoding and decoding, serial bus data reception, and tone generation. On the other hand, examples of time-sensitive tasks are bus command interpretation, channel scanning, audio routing, and synthesizer programming.

Instead of being based on time sensitivity implemented by interrupts, operating systems based on message passing for system communication were developed. A "message" is a buffer containing data which controls a process, or a task, and/or supplies it with information required to carry out its operation. Hence, messages are one way for two processes to exchange data, or communicate. Messages also provide the mechanism by which hardware transparency is achieved. A process located anywhere in the system may now send a message to any other process anywhere else in the system if it knows the process's name.

However, for better information-hiding in application programs, such as restricting the scope or range of messages, a protocol, or standard, is needed which goes beyond the facilities of the operation system to add more definition and functionality on the message-passing model. Accordingly, there exists a need to reduce design time and increase design efficiency by utilizing a common software platform for all new radio products.

SUMMARY OF THE INVENTION

Definition and functionality are added by partitioning, or defining, the tasks into layers based on functionality.

Briefly, according to the invention, in a radio transceiver having a microcomputer that controls various hardware dependent components and functions that form a plurality of radio control processes, a method and apparatus of executing the radio control processes comprises providing the microcomputer with a plurality of virtual sources. The virtual sources are for collecting and distributing data generated by the hardware dependent components and functions in the radio transceiver. A plurality of hardware independent tasks for executing the radio control processes are also provided by the microcomputer. A distribution controlling interface standard for controlling which hardware independent task will receive from which virtual source is further provided by the microcomputer.

DETAILED DESCRIPTION OF THE PREFERRED EMBODIMENT

Figure 1:
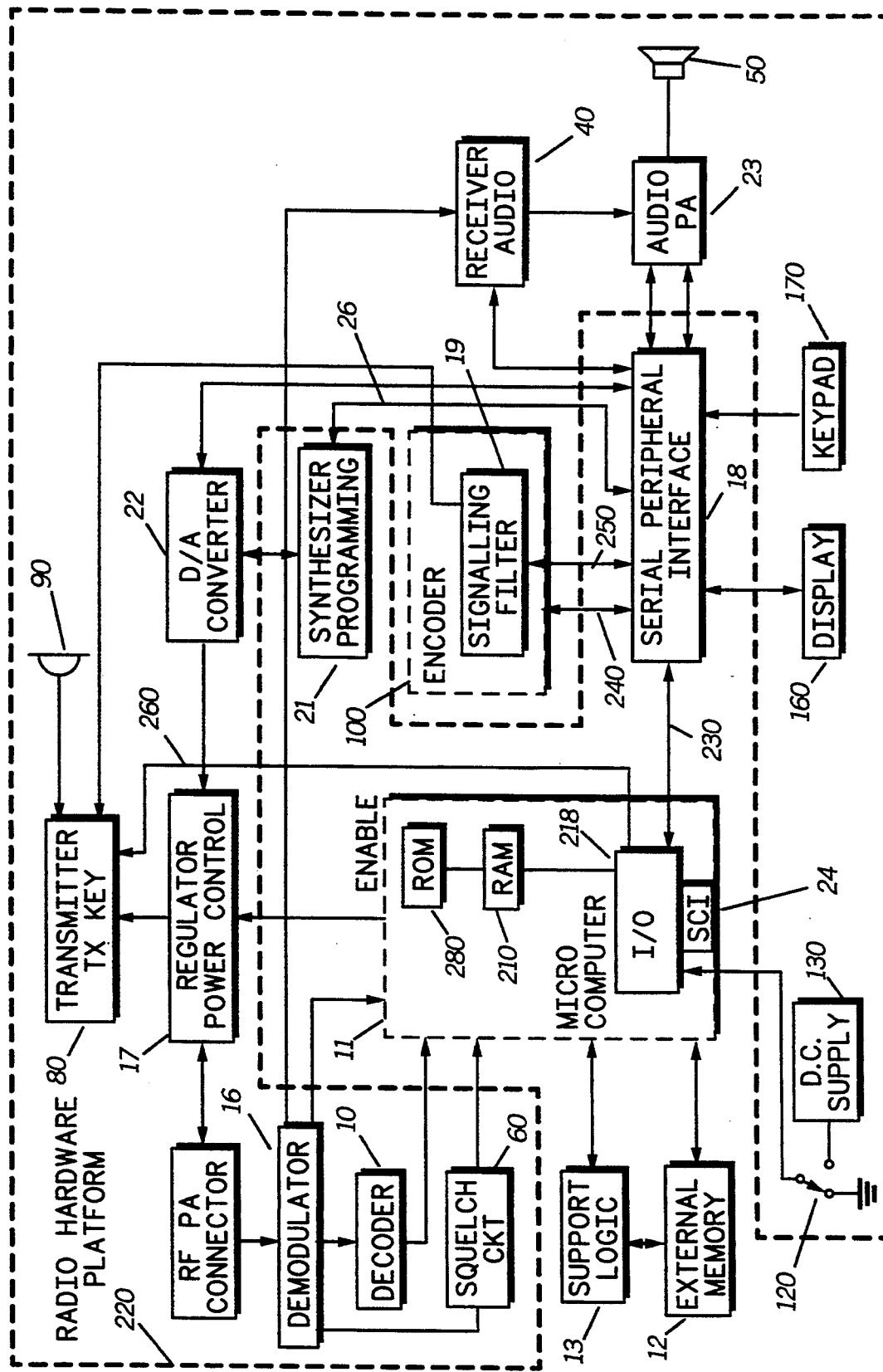
FIG. 1 is a block diagram of a microprocessor/controlled two-way radio, in accordance with the present invention.

Referring to FIG. 1, a microcomputer or microprocessor 11 (such as an MC68HC11 as manufactured by Motorola, Inc.) is connected to various radio hardware components or hardware 220 and other logic units within a communication device, such as a two-way radio. The microcomputer 11 includes internal memories containing read only memory (ROM) 280 and random access memory (RAM) 210, an input/output (I/O) interface 218 and a serial communications interface (SCI) or a low level serial bus handler 24. The other logic components may include an external memory 12 and a support logic 13, as understood in the art.

In addition, a radio frequency (RF) demodulator 16 recovers a transmitted signal and couples it to the microcomputer 11 and to a receive decoder 10. The receive decoder 10 can decode either digitally-modulated data such as trunking Outbound Signaling Word (OSW) information or analog data such as Dual Tone Multiple Frequency (DTMF) signals. Alternately, these decode functions can be performed directly by the microcomputer 11. The squelch circuit 60 provides the microcomputer with carrier detect information.

A transmitter 80 can receive inputs either from a microphone 90 or a data encoder 100, for modulation and transmission on a radio frequency communication channel. The transmitter 80 is enabled by a signal from the microcomputer 11. The microcomputer 11 also controls the data encoder 100 by providing the encoder 100 with an enabling signal via the serial peripheral interface 18. In the preferred embodiment, a momentary switch, commonly called Push-to-Talk (PTT) 120, is normally grounded on one side. Actuation of the switch connects that side of the switch to a logic high in the form of a DC supply 130. The other side of the switch 120 is coupled to the microcomputer 11.

In addition, a regulator power control 17 is controlled by the microcomputer 11 and, indirectly, by a serial peripheral interface 18. The microcomputer 11 programs a signaling filter 19, a synthesizer programmer 21, a digital-to-analog converter 22, and an audio power amplifier 23. A common serial data linkage or bus 230 is used for parametric data transfer and system control.

Basically, the serial peripheral bus 230 is used to establish communications between the radio and peripheral devices such as a display 160 and a keyboard or keypad 170 for entry of data and control information. It is also used for external communications via a connector on the outside of the radio. The radio has all operator and accessory selectable controls accessible via this external serial bus to provide flexibility for future expansions. The serial bus is a physical medium through which data is transmitted and received from the outside world. It is the function of the serial communications interface 24 to provide the physical interface to the serial bus information.

The microcomputer 11 directly interfaces to the radio hardware 220 and performs many of the low-level tasks 240 associated with a particular radio. These tasks may include synthesizer control 21, transmit power level control 17, audio muting 40, channel scanning logic (26), receive/transmit and transmit/receive sequence timing 260, and sub-audible signaling generation and detection 250.

So configured, the microcomputer 11 receives information regarding the functioning of the radio and controls the mode of operation of the radio. For example, in a trunked communication application or mode, the microcomputer 11 provides the necessary software resources to allow interaction with the trunked control center's channel assignment and channel maintenance information, along with other signaling. On the other hand, in conventional radio operation, the microcomputer 11 will support channel scanning activities, priority channel scan activities, and other signaling responsibilities as may be appropriate.

Figure 6:
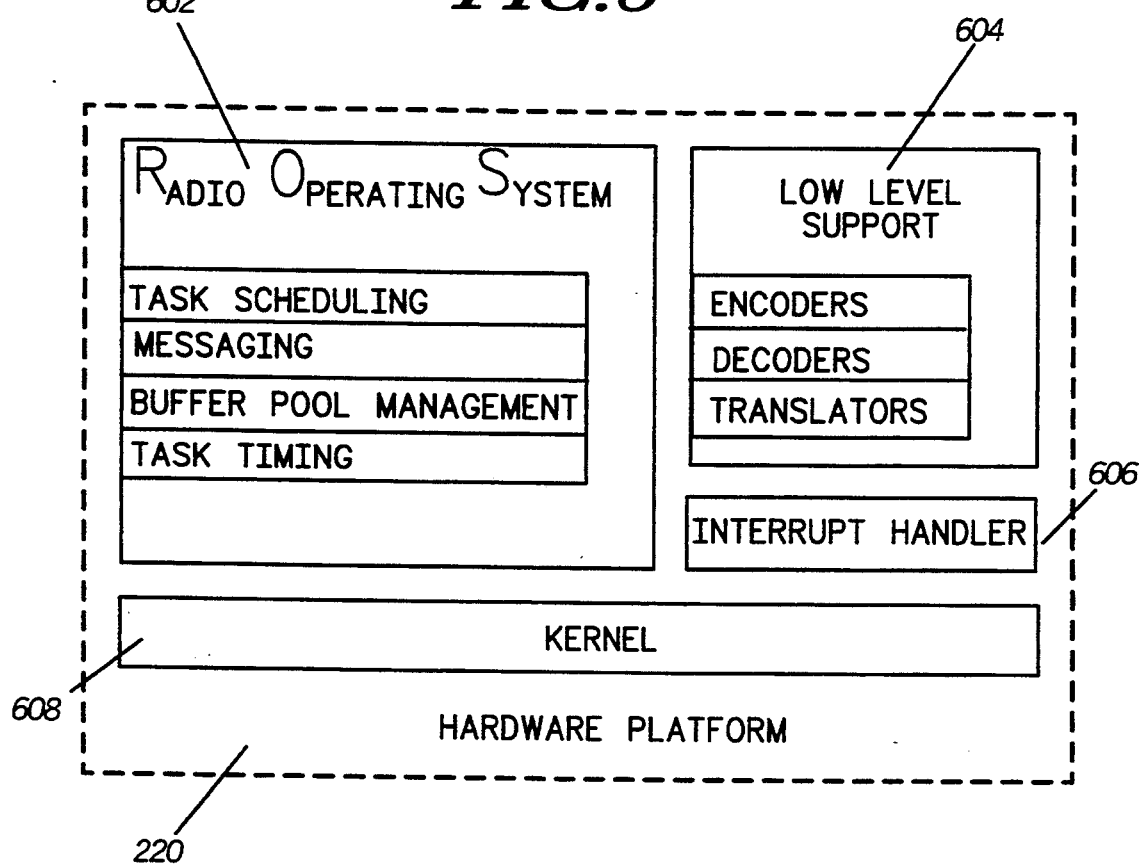
FIG. 6 is a block diagram of the general elements of the hardware platform 220 of FIG. 1.

Referring to FIG. 6, the tasks within the radio software are controlled or scheduled by the operating system within the radio hardware platform 220. In the software operating environment according to the present invention, the software operating system is a Radio Operating System (ROS) 602 developed and optimized for the Motorola microprocessor MC68HC11. This operating system is specifically designed for radio applications to achieve better modularity and to promote reuse. The operating system overlies the control architecture of the present invention and, in general, acts as a manager, scheduler, or kernel 608 for the tasks in the system to provide a hardware interface. Those skilled in the art will appreciate that the kernel 608 may be a subsection of the ROS 602. A separate block is used merely to emphasize the importance of the kernel 608.

The hardware platform 220 includes two other general portions, a low level support 604 and an interrupt handler 606. The interrupt handler 606 handles all of the hardware interrupts. The low level support 604 will be discussed later with reference to FIG. 2. The radio operating system's software (ROS) 602 provides support for task scheduling, intralayer and interlayer messaging (to be discussed later in more detail), buffer pool management, task timing, and memory allocation.

Message handling is a responsibility of the kernel 608. In cooperation with the ROS 602, the kernel 608 partitions the RAM 210 of FIG. 1 to produce a number of buffers. These buffers are used by various components including the microcomputer 11 of FIG. 1 to perform their functions such as messaging. The kernel 608 includes a buffer pool manager for assigning a buffer from the partitioned memory device to each of the tasks.

Alternatively, a buffer pool manager may reside in the ROS 602, instead of in the kernel 608, to provide assistance to the kernel 608 in its buffer pool management tasks. Thus, many of the functions performed by the ROS 602 may be similarly performed by the kernel 608 and vice versa.

In the ROS physical code object model, the system configuration is based on tasks, and task communications are accomplished via simple message models or buffers. Hence, the buffer carries information, parametric data, or arguments between processes or tasks. In the message, a header contains the sender's identification (ID), to inform the receiving tasks as to where the message originated, for the receiving task to properly interpret the data within.

Messages that are sent to a process or task are queued in a first-in-first-out (FIFO) type message queue. There exists a priority queuing mechanism where priority messages get automatically placed at the front of the receiver's message queue.

Every process or task has a unique identifier known as the "task" ID by which it can be referenced. The ID is assigned by the operating system when the process is created, and it is used by the operating system to physically locate the process. Every process or task in the system will have a unique task ID. Messages are directed to a task by referencing the task ID. More specifically, the task ID is a pointer to the task node (or the task control block in RAM 210). There also exists a unique task name for each task which is an eight bit number which uniquely identifies the task or process. The operating system provides a task name to task ID translation. The task ID to task name translation is accomplished by reading the task name from the task node.

A Virtual Radio Interface Standard (VRIS) protocol to support the virtual source concept, in accordance with the present invention, goes beyond the facilities of the operating system (ROS) and adds a layer of definition and functionality on the message passing capability of the operating system. Definition and functionality are added by partitioning, or defining, the tasks into layers based on functionality.

Figure 2:
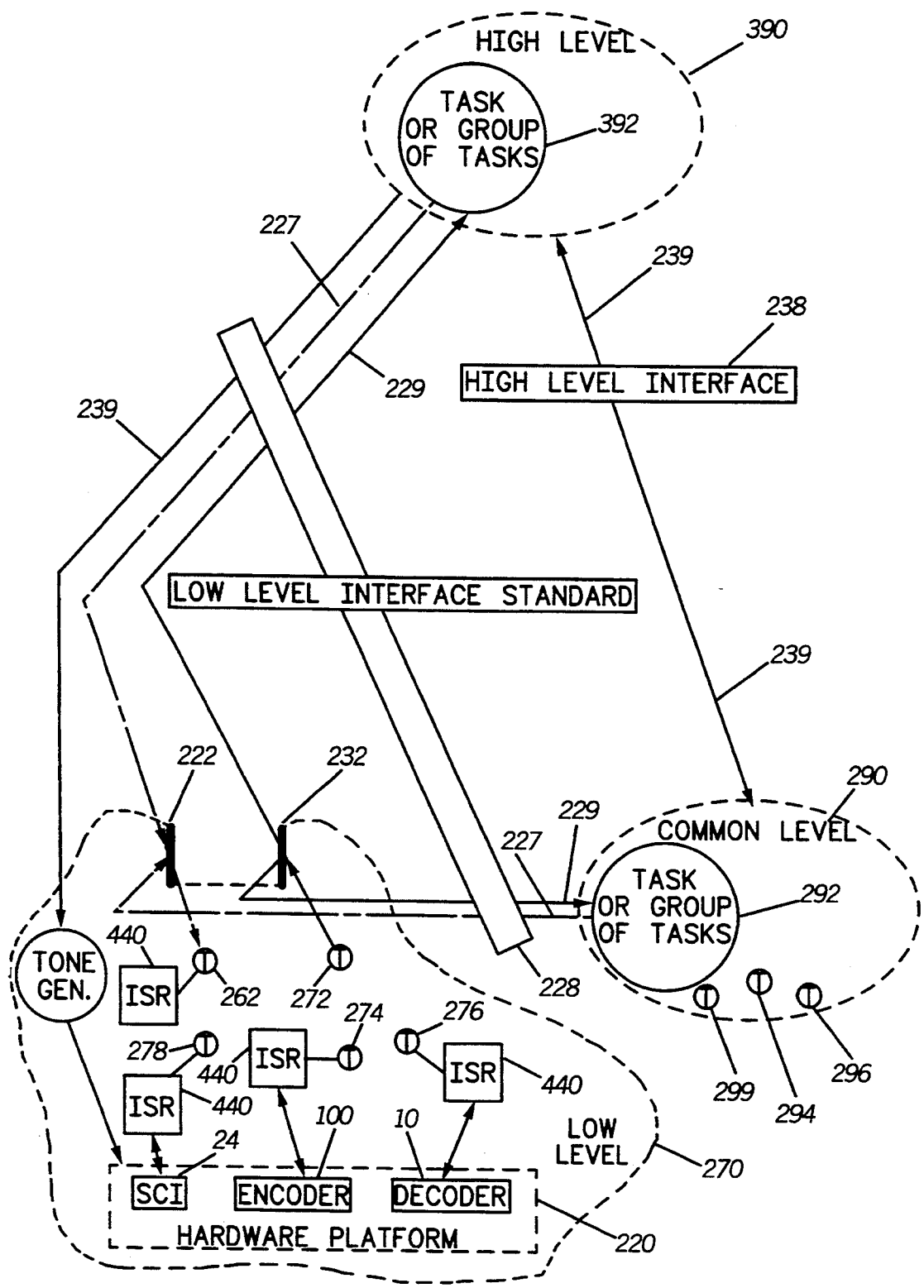
FIG. 2 is a control architecture diagram for controlling the radio of FIG. 1.

Referring to FIG. 2, a three layer standard based on the functionality of VRIS is illustrated. A dashed line implies a separation between one of the VRIS layers, with the choices of layers being low 270, high 390, and common 290. A layer is simply a collection of related processes, or tasks (for example 272, 282, and 392).

A circle implies a ROS task, or a set of ROS tasks, allowing a hierarchical representation of the system. Thus, the layers partition the tasks into smaller, more manageable subsystems. The related tasks perform functions that are comparable in terms of level of abstraction or functionality.

In the three-layer standard based on the functionality of VRIS, the hardware routines, such as synthesizer programming 21, and time critical functions such as the hardware interfacing (274, 276, 278) for the encoder 100, the decoder 10, and the serial bus handler 24, respectively 18, form part of the low level VRIS 270. Hence, examples of low level tasks are serial bus command interpretation 278, and other tasks interfacing the hardware platform 220 such as keypad scanning 170, audio routing 40, and synthesizer programming 21.

Alternatively, the hardware interfacing tasks 274 and 276 can be illustrated as one of the encoders and decoders, respectively, or as other software translators which are part of the low level support 604 of FIG. 6. The encoders are used to encode messages that are transmitted from the hardware platform 220 to the low level interface standard 228. The decoders are used to receive information from the interface standard 228 and convert them to a language that the hardware platform 220 "understands."

Recognizing the uniqueness of user interfaces among radio products, the VRIS standard defines a control or model unique ergonomics level as the high level VRIS 390. The high level VRIS layer is responsible for the user ergonomics of the radio.

The rest of the tasks 292, namely, the various radio features, user requirements, and communications protocols, that are radio independent, or historically stable, are grouped in the common level VRIS 290. Hence, examples of common level tasks are the software interfacing for signal encoding 294 and decoding 296, and tone generation 299.

Tasks that respond to an operator input are further separated into hardware dependent data sourcing tasks 272, such as the sensing of the closing of a switch by the operator, located in the low level 270, and hardware independent data receiving tasks 392, such as executing the radio operation selected by the operation in response to receiving the pressed switch information, located in the high level 390.

Generally, sources and sinks are generators and consumers, respectively, of asynchronous data that is created by the radio software during its operation. Specifically, VRIS functionally defines a virtual source, or a hardware dependent data sourcing task 272, as a method for collecting and distributing data generated in an asynchronous manner. This data includes external data that comes in from the outside world such as any over-the-air signaling (10) data, some forms of internally generated radio information such as receive and transmit state indications, and the already mentioned user inputs, exemplified by key presses on user buttons or switch changes. This data is captured by the hardware dependent platforms 220 of the low level VRIS.

Virtual sources then provide a mechanism to receive low level information independent of the actual hardware that exists in the radio platform. Furthermore, the virtual sources provide a means for other tasks to receive copies of the low level information and to stop receiving these copies on request. This mechanism of receiving copies is referred to as subscribing to a virtual source. Copies of the low level information are sent out via ROS messages to all tasks in a subscriber list. A virtual source performs the collecting of the asynchronously received data. In some cases, the low level-VRIS will further process the data into a more useful form before it is distributed. Thus, the different types of data are collected logically into a set of virtual sources.

Figure 4:
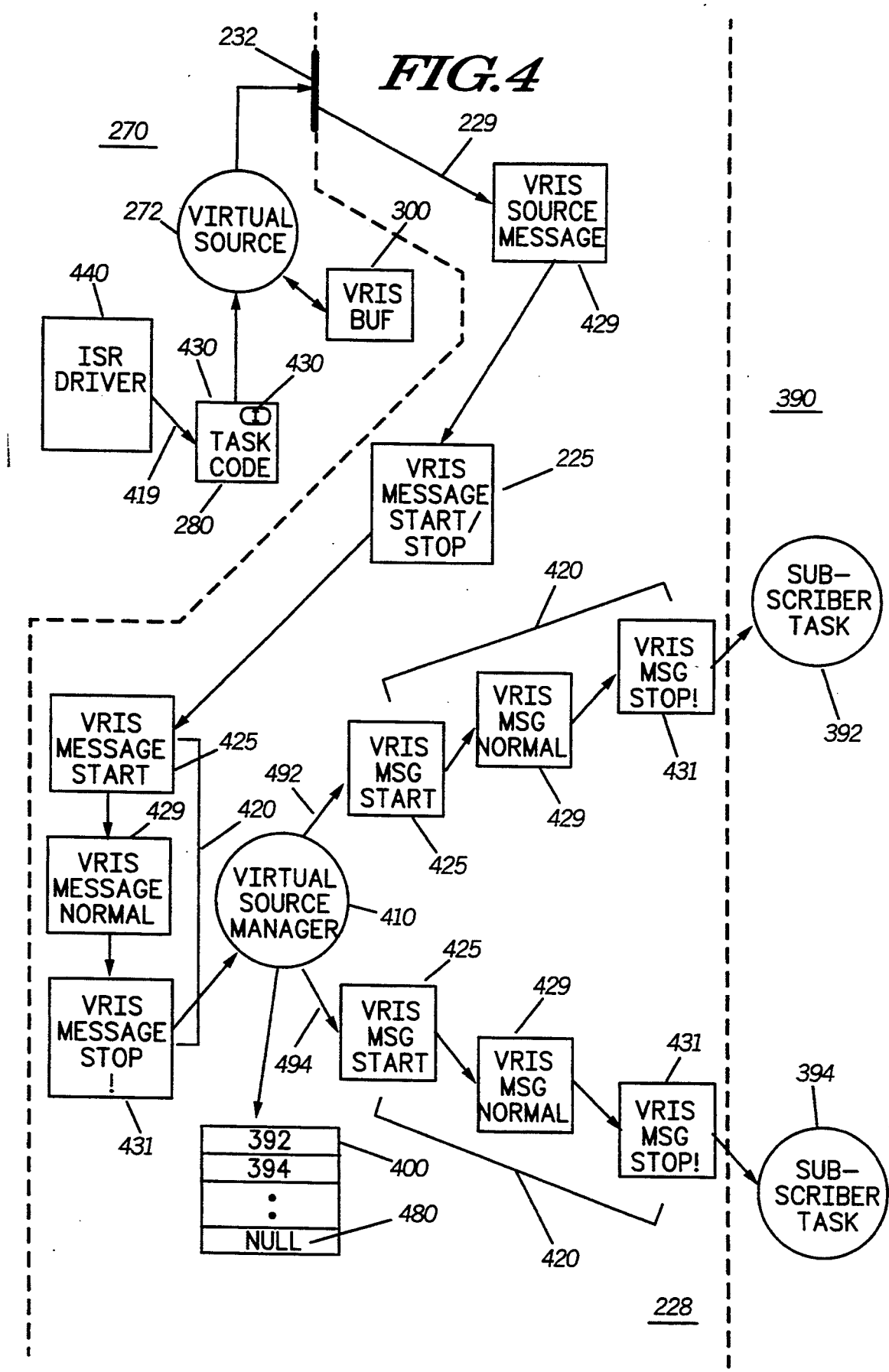
FIG. 4 is a detailed data structure diagram for implementing the function calls and virtual sources in order to apply the Virtual Radio Interface Standard (VRIS) services in the low level 270 of FIG. 3.

The virtual source consists of one or more individual data source or sources 440 of FIG. 4. Typically, a virtual source 272 is associated with or includes a single message generator, software data demodulator, or decoder, which is an interrupt software routine/switch sensor (ISR/driver) combination 440. The individual data sources within a single virtual source are known as virtual source subtypes. An example is the Trunking virtual source that includes subtypes Outbound Signaling Words (OSWs) and Low Speed Data.

One special virtual source is the serial bus virtual source 278. The other defined sources are the following: User Input, Conventional Channel Status, Radio Status, and a collection of virtual sources, collectively referred to as "receive channel data" information for the various data or non-voice information received in different modes during radio operation. The "received channel data" information is thus subdivided into the following virtual sources: the already mentioned Trunking (domestic) Signaling, Secure, Dual Tone Multiple Frequency (DTMF for decoding), Conventional Signaling, and Digital Signaling.

As defined, the System Control Message Identifier Virtual Source is not actually a virtual source but it represents VRIS message definitions that are system commands generated by tasks in the high 390 or common level 290 or from a system timer for task to task control. By defining this class of messages it is simple to add new messages to the VRIS definition which do not pertain to any particular virtual source.

Generally, all communications between layers (interlayer) cannot occur directly because of an interface or boundary separating any two layers. By design, all such interlayer communication must adhere to a standard VRIS format of messaging. VRIS messages are allowed to flow in response to events that occur in the radio, as long as the prescribed format is followed. Furthermore, some of these messages are allowed to flow in response to VRIS function calls and certain prescribed circumstances, as will be described later with reference to the low level.

Specifically, according to the VRIS standard, a process or task, at the common or high level, cannot directly communicate with tasks, such as the virtual sources, in the low level. All communication to and from the low level tasks are done within the low level VRIS definition, which provides a logical interface that hides the actual implementation of the low level from the rest of the software. Thus, separating the high 390 and common 290 levels from the low level is a low level interface 228.

Expanding the separation between layers, a high level interface 238 is also illustrated, separating the high level 390 from the common level 290. The benefit of having multiple interfaces is improved partitioning which promotes the reusability of code.

The interfaces 228 and 238 are pre-defined sets of functions and/or message formats which allow a task to be designed and written independently of other tasks in the system. Making up the high level interface 238 is a pre-defined set of ROS message formats 239, which allow the tasks on either side of the interface 238 to communicate with each other. Notationally, solid lines with arrowheads 239 joining the tasks imply that ROS messages are sent from one task to another.

The low level interface 228 includes a pre-defined set of ROS message formats 229 that are defined by each of the individual virtual sources. Additionally, the low level interface 228 also includes a pre-defined set of low level VRIS functions calls 227 which allows the tasks on the high and common level side of the interface to communicate information to the low level. Notationally, function calls 227 are represented by hyphenated lines.

Figure 7:
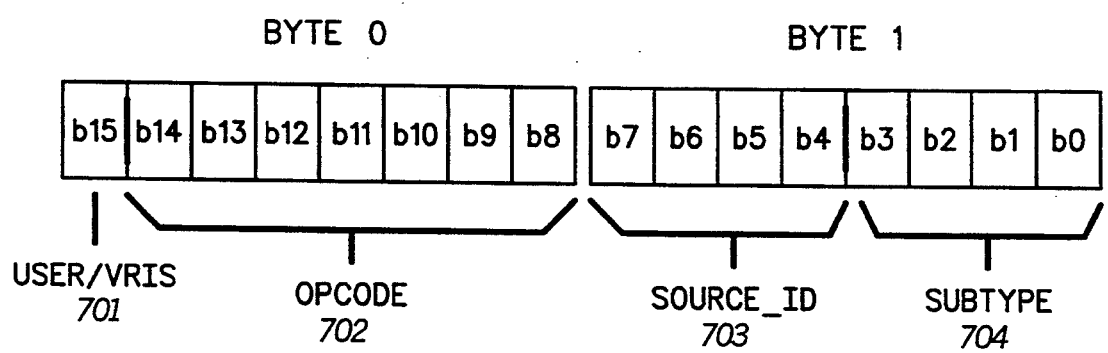
FIG. 7 is a format diagram of a message header for the messages 229 and 239 of FIG. 2.

According to the interface definitions, all messages 239 and 229 crossing any interface 238 or 228 must have a standard VRIS header format as seen in FIG. 7 preceding any data, if any. The message format 700 consists of four fields: a User/VRIS field 701, an Op-code field 702, a Source ID field 703, and a Subtype field 704 contained in a sixteen bit structure. A one or zero flag in the User/VRIS field 701 is an indicator as to the interpretation of the remaining fifteen bits. A zero in this position denotes a VRIS message header while a one indicates a User header in which no standard format need apply.

The Source ID field 703 indicates any one of the virtual sources already named. Since the System Control Message Identifier Virtual Source is not an actual virtual source as defined, if it is the virtual source identified in this field 703, then the optional data following the formatted header together with the header forms a message 239 crossing the high level interface 238 or originating from a timer. On the other hand, if the source is anything other than the System Control Message Identifier, then the optional data following the formatted header, together with the header is now a message 229 crossing the low level interface 238 from the low level 270.

The Subtype field 704 specifies the message type. Examples would be OSWs and Low Speed Data subtypes already mentioned for the Trunking virtual source. Thus, the Source field 703 and the Subtype field 704 together represent the exact source of the message.

Finally, the Op-code field 702 provides either message selections within the source and the subtype or a set of action codes, or operational codes, associated with this source and subtype collection of information. Examples of op-codes are chosen from a group of generic commands such as, but not limited to, the following: stop, start, detect, undetect, status, null, state, marker, link, time-out, and low battery.

Thus, by formalizing and standardizing the interface definitions, a task in the high level or common level can be written using the interface definition independent of the existing hardware platform. The newly designed task then becomes independent of exactly how the low level is implemented. This high degree of independence provides better reuse of the software on each side of the interface.

Specifically, the data that originates from the low level must cross the low level VRIS boundary to be received by any other task in the common or high levels in a hardware independent manner. This is accomplished through the virtual source concept and definition. The virtual source will send ROS messages, containing information on the data received, to all tasks that are currently subscribed to the virtual source. Thus, VRIS defines a standard software interface to the radio hardware to perform specific functional operations.

The low level hardware interface 228 then provides the set of software services used by the ergonomics (high level) 390 and features (common level) 290 levels, or layers, to communicate with and control the hardware platform 220. If the various radio features and user requirements are developed using the set of standard procedures, methods, and rules, namely the LL-VRIS services, the effort to change the features or user requirements to accommodate a new radio product would be limited to developing only the services, for example, a low level call, to access the new hardware in a manner compatible with the defined standard. Function calls 227, adhering to the VRIS standard for form and interface, are the software routines capable of performing specific radio functions through the use of radio-independent software which may be used in conjunction with ISR/drivers 440 (or switch sensors) and/or services 222.

Notationally, a dark vertical bar implies the representation of a low level (LL-VRIS) service which is part of the low level interface 228. The part of the low level VRIS interface with a hyphenated line going into it is then a "sink." As will be described in more detail later, a low level-VRIS service can be a sink 222, which implies that one of the corresponding low level-VRIS functions was called by a task in the high 390 or common 290 levels. The low level 270, containing the specific radio tasks, is thus controlled from common and-/or high level calls 227. Obviously, the low level services must be visible to all the other calling functions from the common and high levels. The low level virtual source services 232 which generate ROS messages, in response to the function calls by the sinks, are represented by dark vertical bars with a solid arrow emanating from each of them.

Figure 3:
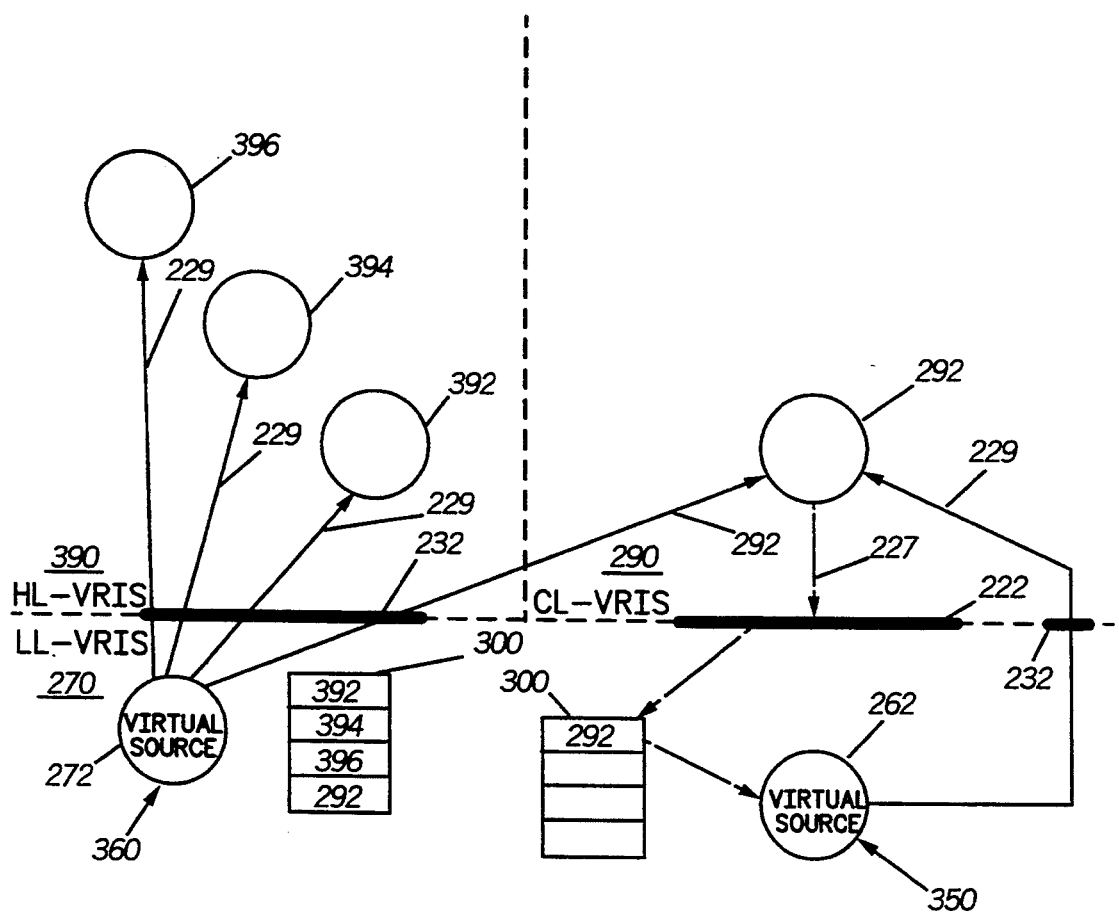
FIG. 3 is a data structure diagram for implementing function calls and virtual sources in order to apply the Virtual Radio Interface Standard (VRIS) services in the low level 270 for some of the tasks of FIG. 2.

Referring to FIG. 3, the workings of function calls and virtual sources are shown and explained in order to apply the VRIS services in the low level of FIG. 2. Basically, the VRIS message protocol definition provides a means for all the captured data to be presented to ROS tasks in a hardware independent manner.

Function calls (227) allow subscriptions to any virtual source. Generally located in the common (290) and high (390) levels, the ROS tasks 292, 392, 394, 396, are the receivers of the Virtual Source messages (229). The high level (392, 394, 396) or common (292) level task that makes a call 227 to a virtual source 262 or 272 to retrieve captured data, based on a particular event 350 or 360, respectively, will receive that data via a ROS message 229.

To manipulate the different types of virtual sources, the services (222) allow a task 292, designated a data receiving task, to control whether it subscribes to a virtual source 262 (in order to receive information 229). There are two ways in which a ROS task can control how these messages 229 are sent; one is by subscription, and the other is by source enablement.

A ROS task 292 must inform the low level VRIS layer 270 which VRIS source(s) it wishes to request data from by subscribing to each of the desired virtual source 262. Conversely, by canceling its subscription, a task can stop receiving the data. Any data captured, based on the event 350 or 360 that comes from each of the subscribed virtual sources 262 or 272, respectively, will be distributed (232) via standard ROS messages 229, in a message stream, to all the subscribing ROS tasks (292, 392, 394, 396) that requested the data.

Figure 5:
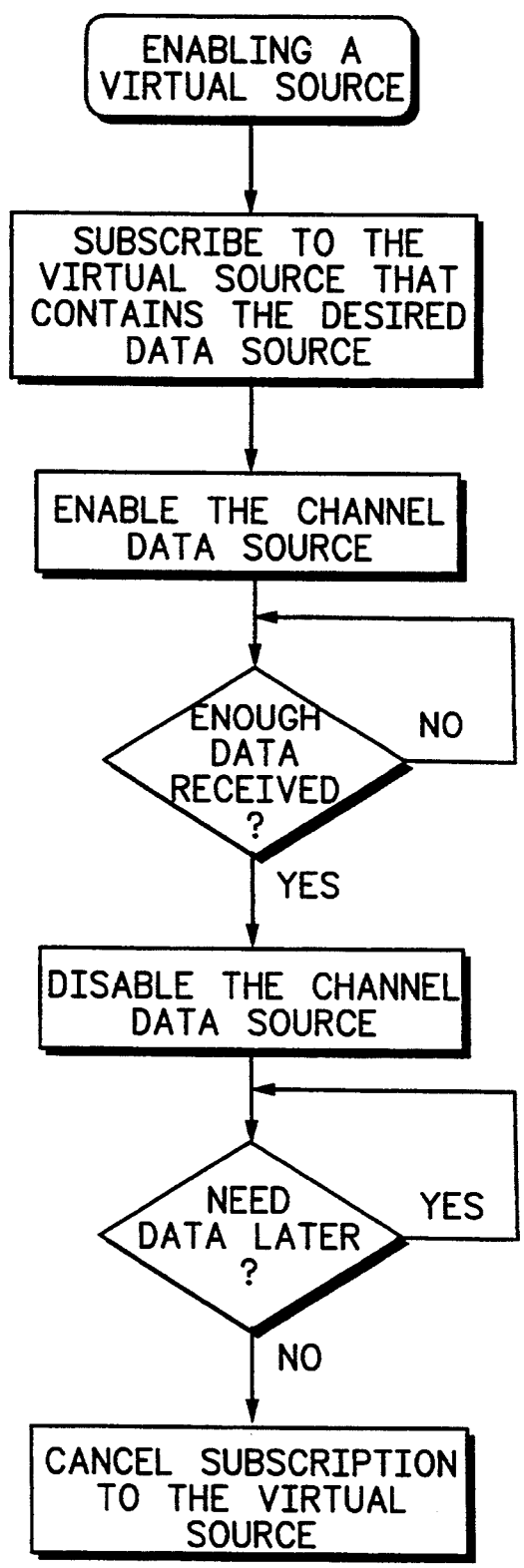
FIG. 5 is a flow chart showing the preferred sequence of steps for properly controlling the virtual sources of FIG. 2.

When a task 292 subscribes (222) to a virtual source 262, it will simply get the next message that comes from that source 262, assuming that source has already been enabled to start collecting data. The service call returns no indication of the state of the subtype message generators within that source type, (whether enabled or disabled). For this reason, care should be exercised when enabling and disabling the individual data sources (subtypes) within a virtual source. FIG. 5 shows the preferred sequence of steps for enabling and disabling an individual data source, in general.

The embodiment of the subscription and cancellation VRIS services 222 are two different software subroutines as seen by software above the low level VRIS layer 270. These subroutines 222 accept, as parameters, the previously defined task ID of the subscribing task and the Virtual Source being operated on.

Referring to FIG. 4, in one possible and more detailed embodiment, in accordance with the invention, subscribing to a virtual source 272 essentially gives a "virtual source manager" 410, the task IDs 392 and 394 of the subscribing tasks. This ID transfer will let the manager 410 know where to direct or distribute each copy 492, 494 of the message stream 420, made by the virtual source 272. The subscription queue or buffer 400 of the virtual source manager 410 then contains a list of task IDs (392 and 394) denoting which tasks are subscribed to which virtual sources (272). Empty positions 480, in the buffer 400, will contain Null, indicating that there are no subscribing tasks in those positions.

If no NULL position is found, then the subscription limit for that particular virtual source has been reached, and an error should be returned. To protect against a task mistakenly trying to subscribe more than once to the same source, the table should first be searched for an entry that matches the requesting task's ID; if found, the operation is over, since that task is already on the subscriber list 400 for that source 272.

The data structures, or buffers 400, of the virtual source manager 410 must be initialized before any task can subscribe to any virtual source. Initialization may involve sending messages to tasks or simply writing into the global areas and initializing any protective semaphores that might exist.

When a sourcing task or virtual source 272 gets a message (419) from an ISR 440 that collected the raw data, the task 272 will process it (perhaps decoding the raw data or doing some other translation). Then, the list of subscribers, in the buffer 400 will be examined to start sending copies 492 and 494 of the result 420 to all of the subscribers 392 and 394 of the non-NULL task IDs. All the subscribed tasks 392 and 394 are then queued a copy 492 and 494 of the message 420 containing the data 429 which will be put in a buffer for each task 392 and 394. The virtual source manager 410 that reads the table 400 to send out copies 492 and 494 will simply read the subscribed task IDs from the table 400, and not be concerned with new subscribers being added (396) or deleted, since those subscribed tasks (396) must account for messages missed or extra ones being received before their subscription (or cancellation) actually takes effect. However, any subscribed task (392) should be aware that other subscribed tasks (394) may be listening to the same message stream 420 and acting upon those messages 429.

Conversely, when a task does not wish to receive any more messages, it must inform the low level 270 to cancel its subscription to the virtual source by calling a service 227 of FIG. 2 to cancel the receiving of the message copies. The service 227 will then take the task ID off of the "copy to" list maintained by that particular virtual source's buffer. Canceling a subscription to a virtual source, thus, takes away the subscribing task's ID from the virtual source manager's buffer 400, thereby stopping the message stream to that particular task.

Hence, when a task wants to cancel getting virtual source copies, the service 227 would search for the calling task's ID in the table 400, and, if found, replaces it with a NULL (480). Since a task may not be subscribing to the same virtual source more than once, the rest of the table does not have to be searched. If the calling task's ID is not found in the table, then no error actions are taken.

The subscription (and the corresponding canceling) service 227 to virtual sources is available for all sources except the Serial Bus 278 of FIG. 2. Since once a task has connected to the serial bus input (218), the serial bus handler 24 will forward all received serial bus messages to the connected task and will not do any processing of the received information, the serial bus virtual source 278 offers a one-time connection only. There are no provisions provided for disconnecting (or canceling the subscription) from the serial bus input once a task has connected. Once connected, all received serial bus messages will be sent to the connected task. It is expected that the low level serial bus handler 24 will parse the incoming packets and distribute them within the low level to the appropriate logical tasks.

Since virtual source messages 420 can pile up if not discarded, subscribing tasks must give a significant amount of attention to their input message queue. A copy of every incoming message should be fetched, parsed, acted on, and then discarded. Tasks that subscribe to a virtual source have the responsibility to parse incoming messages to determine their source (by interpreting the message header), and their meaning 429. ROS, separately, defines how to fetch messages and discard the message buffers when the task is done with the message buffer. For example, after a message has been examined and optionally acted on, the message buffer must be consumed or freed, using a ROS directive Free—$_{Buf.}$ However, before ever being able to receive (229) a virtual source message 429 from a virtual source 272, that virtual source 272 has to be enabled (by another type of function calls 227 of FIG. 2) first. Hence, another way tasks may control the messages 420 that are sent 229 from a Virtual Source 272 is by actually enabling or disabling (272) the individual data subtypes. Data sources that are enabled or disabled in the virtual source can effect a corresponding Interrupt Service Routine (ISR) or/and driver combination 440. In other words, the ISR/Driver combination can be turned ON and OFF in response to enable and disable functions 225 of FIG. 4.

Again, these enable and disable functions 225 are embodied through different software subroutines as seen by software above the low level VRIS layer 270. The subroutines accept parameter(s) that configure the capture of the data itself 429; the name of the subroutine implies what data subtype is being operated on. For example, if one task enables a particular data subtype, all tasks 392 and 394 subscribing to the corresponding Virtual Source 272 will start receiving (229) the resulting messages 429 from the data subtype. A different task could disable that same subtype, and all subscribed tasks would stop receiving from that data subtype.

As one implementation method, the enable and disable functions 225 insert special messages, known as START 425 and STOP 431 messages or op-codes, into the virtual data source message stream 420 to mark the start and end of actual data 429, respectively.

The low level 270 must do its own initialization of its data structures, or buffers 300, in an appropriate manner. This manner could simply involve an initialization portion 430 (of the task code 280) of each sourcing task 272 that is the true sender 440 of each virtual source data 429. When an enable subroutine is called, the low level VRIS layer virtual source 272 or subtype initializes itself (440) for collecting the desired data or data subtype. In one implementation method, the source manager 410, in the low level interface 228, is the one actually turning ON or OFF the individual ISR/drivers, message generators, or demodulators 440. The initialization process entails starting up the appropriate software resources (ISRs) 440, signaling particular applications specific integrated circuits ICs (ASICs) or processors. Once the initialization process is complete, the source 272 also sends a generic START message 425 to all tasks 392 and 394 subscribed to the corresponding Virtual Source 272 or its data subtype (including the one that enabled the source, if it had subscribed), to inform them that this data source 440 or its subtype has started to collect data. All START messages 425 occur after an enable call is executed for that particular data source 440 or subtype and are sent as a normal (non-priority) message.

Likewise, when a disable subroutine is called, the virtual sourcing task 272 in the low level VRIS layer 270 ceases to collect data from that data source 440 or data subtype. It also sends a generic STOP message 431 to all the tasks 392 and 394 subscribed to the corresponding virtual source 272 (including the one that enabled it, if it had subscribed) to inform them that this data source 440 or its subtype has been terminated. However, STOP messages 431 occur in response to disable calls and are sent as priority messages. The priority (!) aspect of the message guarantees that the STOP message 431 will be seen before any "old" pending data messages have been sent to the task but have not yet been retrieved from the message queue (messages may be waiting in the task message queues of any of the subscribing tasks 392 and 394). By definition, a priority STOP message 431 will be received in front of, any unprocessed message from that particular data source 440/272, so that the receiving task 392 or 394 can distinguish between messages coming from old and new enabled sessions. Messages between a new STOP and an old START can thus be easily discarded. In this way, a subscribing task can avoid processing asynchronous data messages that occurred before another task stopped the source subtype.

However, some virtual sources are unique and are not ISR/driver combinations 440. These unique virtual sources are continuous in nature and thus, do not require enable/disable functions 225. Subsequently, these sources do not have explicit START and STOP messages within their message streams.

Specifically, the Radio Status virtual source is an internally generated source of messages that behaves as if it were a virtual source that can be subscribed to but has no start and stop capability. Thus, after being enabled upon power-up, the Radio Status virtual source runs continuously. Tasks that subscribe to the Radio Status virtual source would then receive all messages without explicitly enabling the source.

In summary, a virtual source captures data and sends it, along with a VRIS formatted header, to the message queues of all the tasks that had previously subscribed to the source, after the source has been enabled by that task or another task. The subscribed task will continue receiving the data until the subscribed task cancels the subscription or the source stops collecting data when it has been disabled by that task or another task.

What is claimed is:

1. A radio transceiver, comprising:
   a plurality of operating hardware-dependent components and functions;
   a plurality of operating hardware-independent components and functions;
   a plurality of hardware-dependent tasking means for collecting asynchronous data generated by the hardware-dependent components and functions, each of the plurality of tasking means include a translator for translating the collected information;
   a plurality of highly time critical interrupt software routine drivers for providing the plurality of tasking means with high priority and uninterruptable information;
   a plurality of virtual sourcing means for distributing asynchronous data generated by the plurality of hardware-dependent tasking means and the plurality of interrupt software routine drivers;
   a plurality of hardware-independent tasking controllers for executing radio control processes of the hardware-dependent components and functions, the controllers comprising:
      first means for directing the plurality of hardware-dependent tasking means to commence collecting data generated by the hardware-dependent components and functions;
      second means for directing the plurality of hardware-dependent tasking means to cease collecting data generated by the hardware-dependent components and functions;
      third means for directing the virtual sourcing means as to when to commence delivering data to the hardware-independent tasking controllers and when to stop the delivery;
   a plurality of buffers for storing a table comprising a list of hardware-independent tasking controllers that are subscribed to receive translated information from the plurality of hardware-dependent tasking means; and
   a virtual source manager for copying and sending messages to all the subscribed hardware-independent tasking controllers including sending prioritized stop messages when the hardware dependent tasking means stops collecting data.

2. The radio transceiver of claim 1, wherein the third means for directing comprises an operating system scheduler.

3. The radio transceiver of claim 1, wherein the third means for directing comprises a subscription manager to maintain a list of which hardware-independent tasking controllers are to be delivered data.

4. The radio transceiver of claim 1, wherein the third means for directing comprises an interface standard between the virtual sourcing means located in a first level and the hardware-independent tasking controllers located in another level of task hierarchy based on functionality.

5. The radio transceiver of claim 4, wherein the interface standard comprises a plurality of function calls to allow one-way communication from the hardware-independent tasking controllers to the virtual sourcing means and a plurality of buffered messages to allow one-way communication from the virtual sourcing means to the hardware-independent tasking controllers.

6. The radio transceiver of claim 5, wherein the plurality of function calls comprises subscription calls for the hardware-independent tasking controllers to subscribe to the virtual sourcing means for selectively receiving distributed data from the virtual sourcing means.

7. The radio transceiver of claim 5, wherein the plurality of function calls comprise calls that enable the hardware-independent tasking controllers to selectively cause the plurality of hardware-dependent tasking means to collect data.

8. The radio transceiver of claim 5, wherein the plurality of function calls comprise calls that enable hardware-independent tasking controllers to selectively cancel the subscription to the virtual sourcing means to stop receiving distributed data from the virtual sourcing means.

9. The radio transceiver of claim 5, wherein the plurality of function calls comprise calls that enable the hardware-independent tasking controllers to selectively cause the plurality of hardware-dependent tasking means to finish collecting data.

10. In a radio transceiver having a plurality of operating hardware-dependent components and functions, a method for coordinating the operation of the operating hardware-dependent components and functions, the method comprising the steps of:
    separating radio control processes in a plurality of tasks;
    partitioning the plurality of tasks into a plurality of hardware-dependent data sourcing tasks and a plurality of hardware-independent data receiving tasks;
    designating the data sourcing task for selectively receiving data from the sourcing task;
    collecting data generated by the hardware-dependent components using highly time critical interrupt software routine drivers;
    translating the data in the plurality of hardware-dependent tasking means;
    transferring the translated data from the hardware-dependent tasking means to the virtual sourcing means;
    distributing the translated data from the virtual sourcing means to the designated hardware-independent tasking controllers; and
    executing hardware-independent radio control processes in the subscribed hardware-independent tasking controllers.

11. The method of claim 10, wherein the designating step comprises the step of receiving, by the receiving task, of all the distributed data from the sourcing task and further including the step of selecting desired data from the distributed data for selective reception.

12. The method of claim 10, wherein the designating step comprises subscribing to the data sourcing task by the receiving task for selectively receiving distributed data from the sourcing task.

13. The method of claim 10, wherein the designating step comprises selectively enabling the data sourcing task to start collecting data.

14. The method of claim 10, wherein the designating step comprises canceling the subscription to the data sourcing task by the receiving task to selectively stop receiving distributed data from the sourcing task.

15. The method of claim 10, wherein the designating step comprises selectively disabling the data sourcing task to finish collecting data.

16. In a radio transceiver having a plurality of operating hardware-dependent components and functions, a control for coordinating the operation of the operating hardware-dependent components and functions, the control comprising:
    a plurality of operating hardware-dependent components and functions;
    a plurality of operating hardware-independent components and functions;
    a plurality of hardware-dependent tasking means for collecting data generated by the hardware-dependent components and functions, each of the plurality of tasking means include a translator for translating the collected information;
    a plurality of highly time critical interrupt software routine drivers for providing the plurality of tasking means with high priority and uninterruptable information;
    a plurality of virtual sourcing means for distributing asynchronous data generated by the plurality of hardware-dependent tasking means and the plurality of interrupt software routine drivers;
    a plurality of hardware-independent tasking controllers, for executing radio control processes of the hardware-dependent components and functions, at least one tasking controller having a source identification for the tasking means to designate as a subscriber for the virtual sourcing means to know from which of the tasking means the subscriber wishes to receive data from, the tasking controllers comprising:
        first means for directing the plurality of hardware-dependent tasking means to commence collecting data generated by the hardware-dependent components and functions;
        second means for directing the plurality of hardware-dependent tasking means to cease collecting data generated by the hardware-dependent components and functions;
        third means for directing the virtual sourcing means as to when to commence delivering data to the hardware-independent tasking controllers and when to stop the delivery;
    a plurality of buffers for storing a table comprising a list of hardware-independent tasking controllers that are subscribed to receive translated information from the plurality of hardware-dependent tasking means; and
    a virtual source manager for copying and sending messages to all the subscribed hardware-independent tasking controllers including sending prioritized stop messages when the hardware dependent tasking means stops collecting data.

17. The control of claim 16, wherein the plurality of virtual sourcing means comprises interrupt software routines (ISRs).

18. The control of claim 16, wherein the plurality of virtual sourcing means comprises a plurality of interrupt software routine (ISR) and driver combinations.

19. The control of claim 16, further comprising enabling means for activating one of the virtual sourcing means to start capturing data in order to send it to all of the tasking means that had previously subscribed to the virtual sourcing means.

* * * * *